(12) United States Patent
Boyles

(10) Patent No.: US 8,381,930 B2
(45) Date of Patent: *Feb. 26, 2013

(54) COLLAPSIBLE HARD CASE FOR SURFBOARDS AND OTHER LARGE OBJECTS

(76) Inventor: David A. (Drew) Boyles, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/224,904

(22) Filed: Sep. 2, 2011

(65) Prior Publication Data

US 2012/0228289 A1 Sep. 13, 2012

Related U.S. Application Data

(63) Continuation-in-part of application No. 12/462,216, filed on Jul. 31, 2009, now Pat. No. 8,066,138.

(60) Provisional application No. 61/137,560, filed on Jul. 31, 2008.

(51) Int. Cl.
*B65D 6/00* (2006.01)

(52) U.S. Cl. .......................................... 220/8; 206/315.3

(58) Field of Classification Search .................. 206/315, 206/314, 8, 522, 223; 314/14; 220/8, 4.21; 190/110

See application file for complete search history.

(56) References Cited

U.S. PATENT DOCUMENTS

| 1,751,936 A | * | 3/1930 | Lowe ................................. 206/8 |
| 3,628,655 A | | 12/1971 | Bohanon |
| 4,643,302 A | | 2/1987 | Baumgardner |
| 5,450,956 A | | 9/1995 | Peckenpaugh |
| 5,752,464 A | | 5/1998 | King |
| 6,966,439 B2 | | 11/2005 | Weleczki |
| 2004/0232016 A1 | | 11/2004 | Dietrich |
| 2007/0137959 A1 | | 6/2007 | Zauderer |
| 2008/0000902 A1 | | 1/2008 | Holbrook |

* cited by examiner

Primary Examiner — J. Gregory Pickett
Assistant Examiner — Raven Collins
(74) Attorney, Agent, or Firm — Triangle Patents PLLC

(57) ABSTRACT

A collapsible protective case for surfboards, musical instruments, or other large asymmetrically shaped objects, including a housing having a rigid, impact-resistant outer surface, the housing being formed from a multiplicity of adjoining sections that are selectively configurable between an expanded transport position and a collapsed storage position.

16 Claims, 3 Drawing Sheets

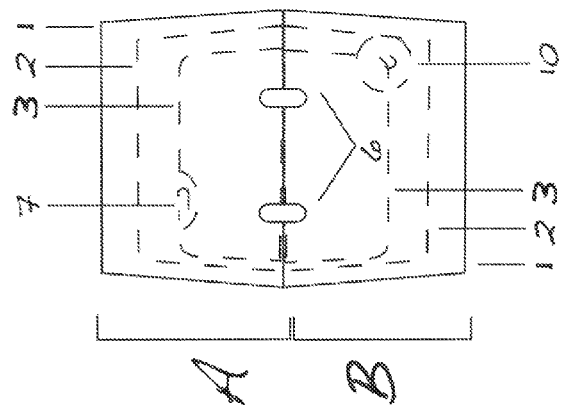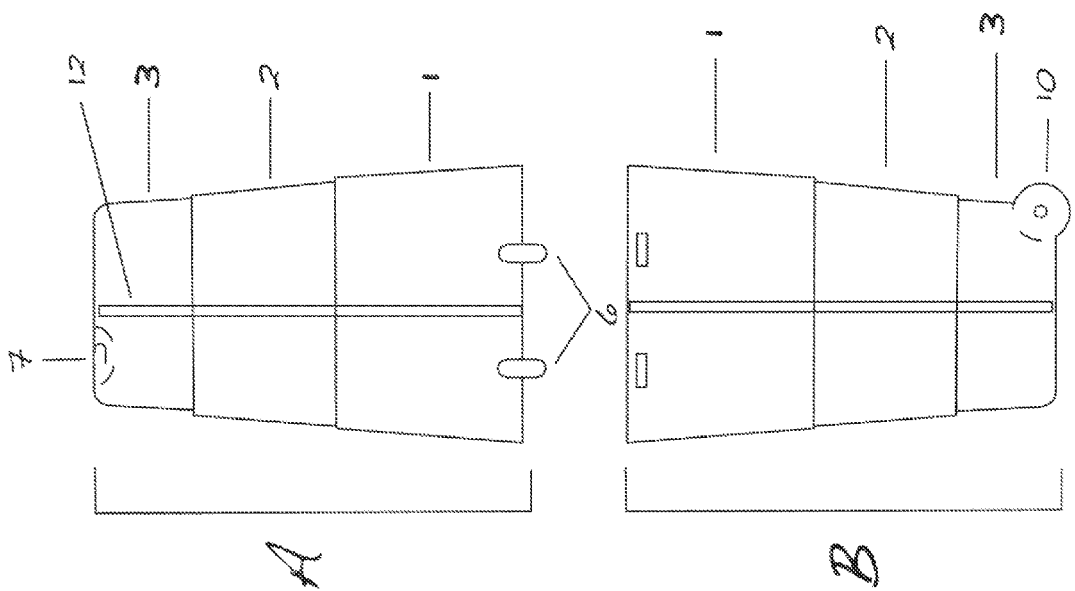
FIG. 3

COLLAPSIBLE HARD CASE FOR SURFBOARDS AND OTHER LARGE OBJECTS

CROSS-REFERENCE TO RELATED APPLICATIONS

The present invention is related to the following applications: it claims priority from U.S. provisional patent application Ser. No. 61/137,560 filed Jul. 31, 2008 and U.S. non-provisional patent application Ser. No. 12/462,216, filed on Jul. 31, 2009, now U.S. Pat. No. 8,066,138 which are incorporated herein by reference in their entirety; it is a continuation-in-part of that non-provisional.

BACKGROUND OF THE INVENTION

1. Field of the Invention

The present invention relates generally to travel cases or containers, and more particularly to a collapsible hard case for protectively transporting a surfboard.

2. Description of the Prior Art

Protective travel cases are generally known. By way of example, (golf bag shipping, etc.) such as US Patent Application Publication No. 2004-0232016 provides a telescoping hard case for carrying a golf bag.

In particular, regarding surfboards, typically surfers travel to remote destinations for participating in the sport, especially for competitions, vacations, etc. Additionally, boards are shipped from manufacturers to distributors, retailers and customers using an archaic, damage prone method of cardboard, bubble wrap and duct tape packaging. There are currently no convenient methods for shipping such boards. Problematically, shipment of surfboards or transport in air cargo damages the board surface and introduces structural stresses that the boards were not designed to be exposed to. In many cases, incidental damage to boards during travel and/or transportation can functionally ruin a surfboard. In a specific circumstance, applicant's surfboard was destroyed by a baggage handler in airline transport to Hawaii from the continental US. Since boards are expensive and surfers typically prefer to use their own board rather than generic boards, especially for more advanced surfers and professionals in competition, there has been a need to provide a protective shipping case or container for surfboards.

Typically, however, containers for shipment of large items, such as the size of a surfboard, are large and bulky. Upon safe transport of the surfboard then, the container must be stored in a correspondingly large space. Surfboards often range in length from 6-10 feet, in width between about 2-3 feet, and in depth about 3 inches.

One commercially available surfboard case offered at the time of the present invention is by Santa Monica Hard Case in California, USA. While this product provides a protective case for surfboards, it is formed of a flexible plastic that leaves the boards vulnerable to damage during transport or shipment. Also, it has limited size options and features. Furthermore, this case does not collapse into itself.

Thus there remains a need for a protective case for surfboards that also provides for convenient storage when not in use.

SUMMARY OF THE INVENTION

A first aspect of the present invention is to provide a protective case for surfboards that is constructed and configured to be used in a fully deployed mode for completely protectively and removably containing a surfboard, and to be alternatively collapsed to a storage mode when not in use.

A second aspect of the present invention is to provide a collapsible protective case for surfboards including a housing having a rigid, impact-resistant outer surface, the housing being formed from a multiplicity of adjoining sections that are selectively configurable between an expanded transport position and a collapsed storage position.

Another aspect of the present invention is to provide a collapsible protective case for surfboards, musical instruments, or other large asymmetrically-shaped objects, the case including a housing having a rigid, impact-resistant outer surface, the housing being formed from a multiplicity of adjoining sections that are selectively configurable between an expanded transport position and a collapsed storage position. The present invention is applicable to objects including, but not limited to, bicycles, drums, keyboards, storage/travel cases, rifles, other weapons, skis, fishing equipment and snowboards.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 3 illustrates side and end views of another embodiment according to the present invention.

DETAILED DESCRIPTION

Figure 1:
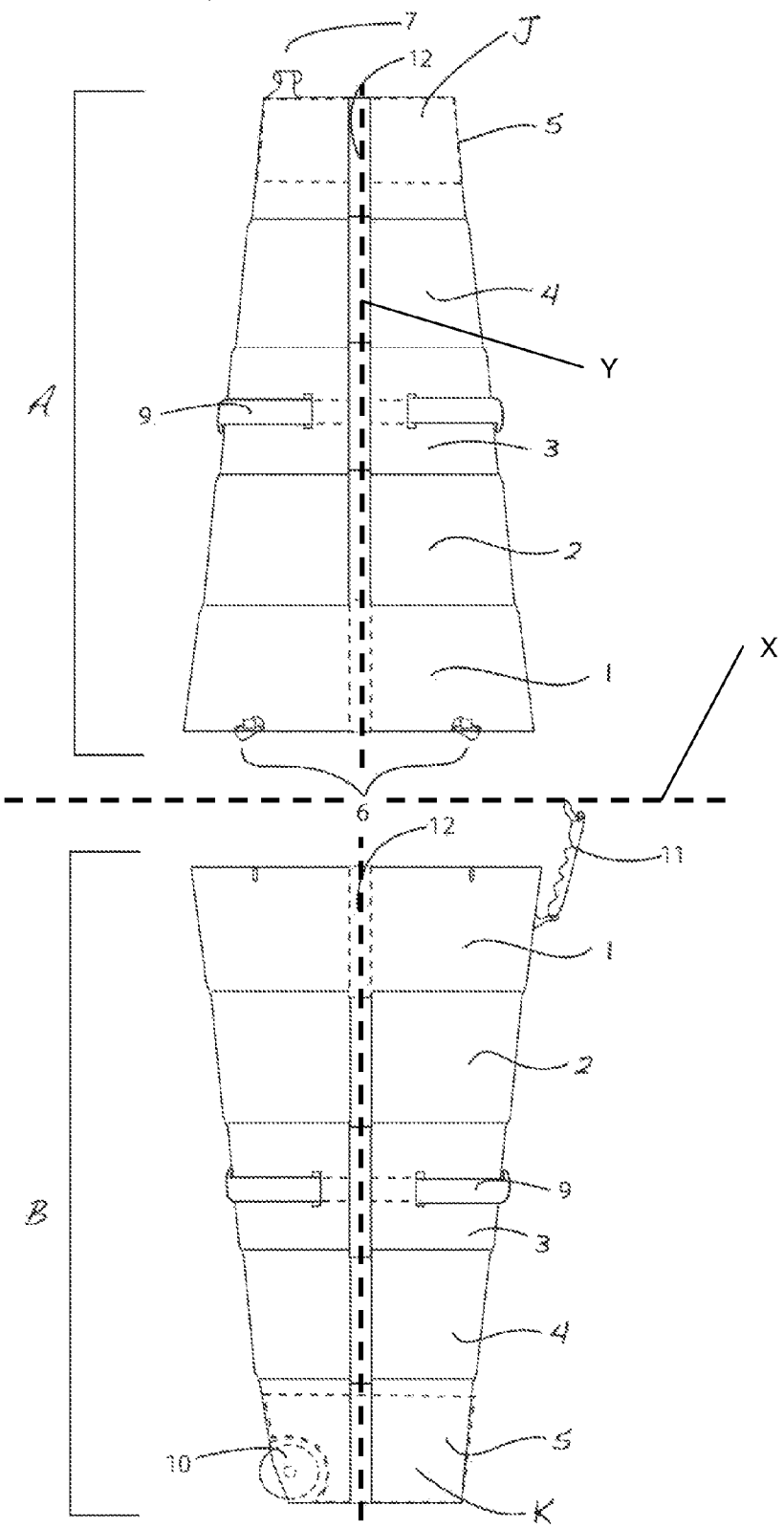
FIG. 1 illustrates a front view of a protective case in an extended mode according to one embodiment of the present invention.

Referring now to the drawings in general, the illustrations are for the purpose of describing a preferred embodiment of the invention and are not intended to limit the invention thereto.

The present invention provides a protective case for surfboards, musical instruments, or other large asymmetrically-shaped objects constructed and configured to be used in a fully deployed mode for completely protectively containing the object, and to be alternatively collapsed to a storage mode when not in use, i.e., when the object is not stored therewithin. More particularly, the present invention includes a collapsible protective case for surfboards with a housing having a rigid, impact-resistant outer surface, the housing being formed from a multiplicity of adjoining sections that are selectively configurable between an expanded transport position and a collapsed storage position.

Preferably, the rigid, impact-resistance outer surface is formed from a hard plastic or composite material that is sufficiently thick to prevent puncture or tearing, resist pressure, flexing or deformation, such that the object contained completely within the housing is protected from any external forces. In a preferred embodiment, the hard plastic shell is at least about ¼ inch thick.

The housing is preferably formed from two mating sections, such as a top and bottom section for completely encasing the object from either end, that are releasably connectable and lockable at the adjoining edges that form the middle of the case when in an extended position, as illustrated in FIG. 1 by two separated sections, namely a nose end section A and a tail end section B. In one embodiment, the two separated sections A and B are approximately equal in size and dimensions. As shown in FIG. 1, with the exception of the wheels and end handle, the housing is preferably symmetrical about the long axis y and about the short axis x, in order to improve the balance of the housing both when in an expanded position for use and of the housing halves when in a collapsed position for storage.

In the case of use for a surfboard, each half is about half the size of a surfboard but slightly larger to properly and protectively secure the surfboard therein when combined together. In the case of use for an asymmetrical object, such as golf clubs, musical instrument, etc., the housing halves remain symmetrical and inserts are provided to compensate for the asymmetry of the object and provide protection to the object.

Figure 2:
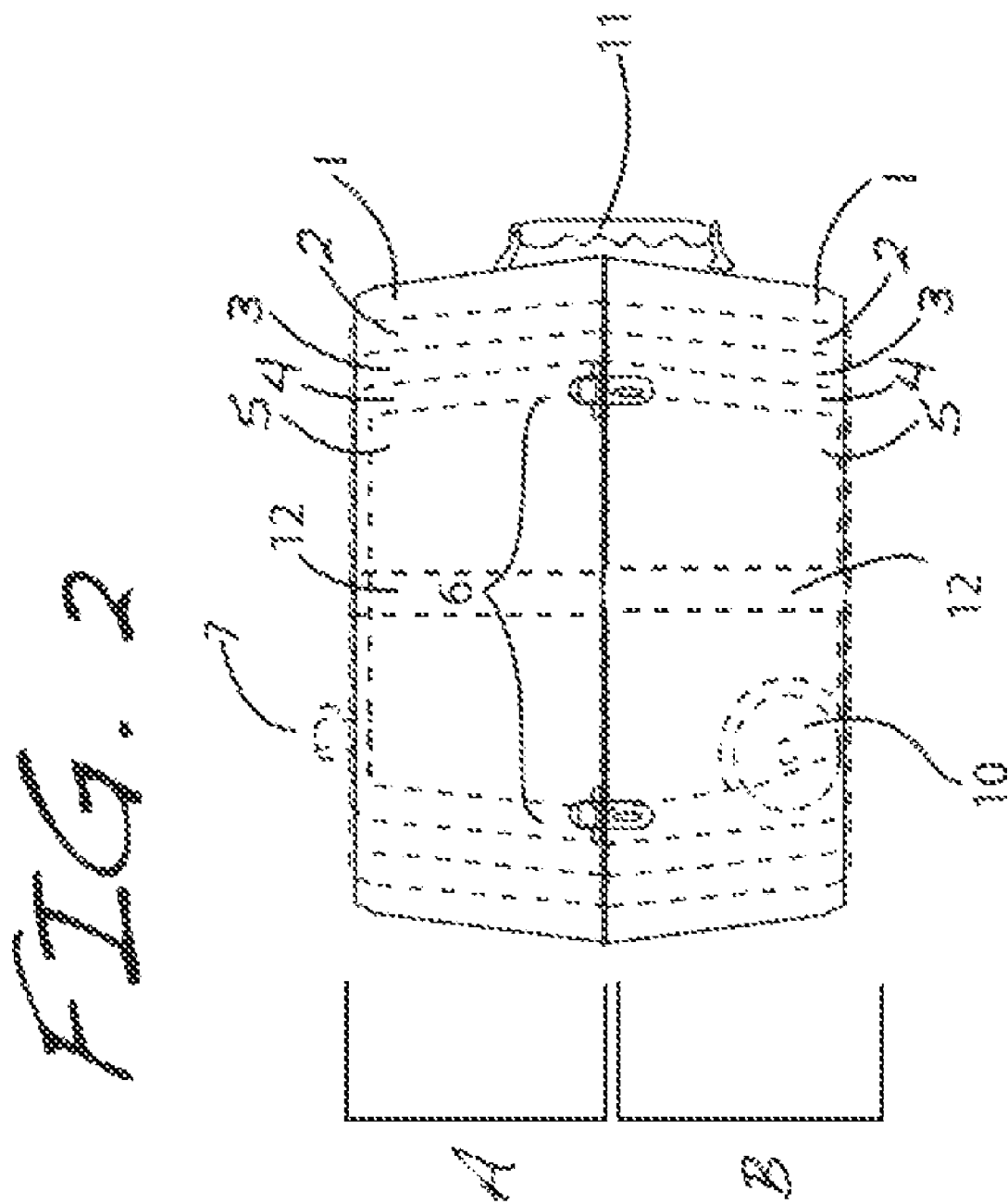
FIG. 2 illustrates an end view of the case shown in FIG. 1 in a collapsed mode.

FIG. 1 illustrates each of the two sections A and B being further comprised of subsections or cells that are constructed and configured to be juxtapositioned in an extended position for housing a surfboard. When not being used for protectively encasing a surfboard, these cells collapse into each other substantially concentrically as illustrated in FIG. 2. In this collapsed mode, the case of the present invention can conveniently be stored in a compact condition. In a preferred embodiment, each of the cells is arranged so that the end-most cells (indicated as 5 in FIGS. 1 and 2) collapse into the larger middle cells (indicated as 1 in FIGS. 1 and 2). Correspondingly, the intermediate cells 4, 3, and 2 collapse between 5 and 1 as shown in FIG. 2 in the collapsed mode.

Referring to FIG. 1, Sections A and B align longitudinally along the board length along line 12, which also provides a track system for releasable locking engagement of the two sections A and B, with section A corresponding to the surfboard nose end and section B corresponding to the tail end. In one embodiment, a notch and lock system 12 provides a releasable securement of the cells with respect to each other to form the rigid housing to protectively encase the surfboard. The nose end A is releasably fastenable to the tail end B by a plurality of latches 6 (shown as four latches in the FIG. 1). A carrying handle 11 is also preferably attached to a side of the case for easier carrying, but is strategically placed on the right side to function as a fifth releasable attaching latch for connecting the sections A and B. Optionally and additionally, wheels 7 are provided at the tail end B and a roller handle 10 at nose end A for easier transport of the expanded case and board assembly. Also, optionally, a roof rack system 9 attached to cell 3 of both nose A and tail B sections is provided.

Optionally a lining within the housing may be provided for additional protection and impact resistance, by way of an impact-absorbing or cushioning lining; by way of example and not limitation, it may be affixed to an inner surface of the housing sections, such as a coating or thin lining affixed thereto. Alternatively, a protective flexible inner sleeve may be used within the protective case; by way of example and not limitation, it may be independent of the housing and applied around the surfboard before the liner-wrapped board is inserted into the case. Preferably, the lining depth on the tail and nose of the case provide flexibility in accommodating size variations of boards.

In the case of a rubber sleeve, the surfboard would first be inserted into the sleeve and then the nose of the surfboard is slidingly placed into a solid foam block J at the end of cell 5 in the collapsed nose end A of the case of FIG. 2. Then the surfboard is pushed into the case, and the 5 cells are extended in the nose end A. Then the tail end of the surfboard is slidingly placed into a foam block K at the end of cell 5 in the collapsed tail end B, and the 5 cells of the B section are extended to cover that portion of the board. Sections A and B are attached by snapping the latches into a closed position (or releasably locked position). Finally, the carrying handle is attached to A using latch 11.

FIG. 3 illustrates side and end views of another embodiment according to the present invention; more specifically, it shows the collapsible case in both extended and collapsed configurations from a side view (extended configuration) and end view (collapsed configuration). In this embodiment, two equal halves are shown, labeled A and B; these sections are divided into three (3) cells labeled 1, 2 and 3. Cell 3 collapses into cell 2 and both cell 2 and cell 3 collapse into cell 1. These cells collapse along a track labeled 12 to ensure cells collapse and extend with ease, while the track also provides rigidity. Latches 6 secure half A to half B. A wheel mechanism 10 is used to roll the case and handle 7 is used for pulling or carrying the case. In embodiments of the present invention, some of the sections or cells are removable or insertable allowing the case to be lengthened and shortened thereby providing maximum size flexibility.

In a preferred embodiment, the case in a housing having a rigid, impact-resistant outer surface, the housing being formed from two equal halves, each half having a multiplicity of adjoining sections that are selectively configurable between an expanded transport position and a collapsed storage position; the housing being symmetrical about the long axis and about the short axis. Furthermore, in a preferred embodiment, the housing halves have equal number of adjoining sections and the housing halves are symmetrical when in an expanded or collapsed position.

Certain modifications and improvements will occur to those skilled in the art upon a reading of the foregoing description. The above mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A protective case for surfboards, musical instruments, or other large objects, the case comprising:
    a housing having a rigid, impact-resistant outer surface, the housing being formed from two equal halves, each half having a multiplicity of adjoining sections that are selectively configurable between an expanded transport position and a collapsed storage position;
    the housing being symmetrical about the long axis and about the short axis; and
    a carrying handle attached to a side of the case, the handle also functioning as a releasable attaching latch for connecting the two equal halves.

2. The case of claim 1, wherein the housing is constructed and configured to be used in a fully deployed mode for completely protectively and removably containing a stored object, and to be alternatively collapsed to a storage mode when not in use.

3. The case of claim 1, wherein the housing further includes a track system that provides releasable locking engagement of the adjoining sections.

4. The case of claim 1, wherein the sections include cells that are constructed and configured to be juxtapositioned in an extended position, and then collapsible into each other in a substantially concentric storage position when not being used for protectively encasing the object.

5. The case of claim 4, wherein some of the sections are removable or insertable allowing the case to be lengthened and shortened thereby providing maximum size flexibility.

6. The case of claim 1, wherein the housing further includes a lining within the housing that provides additional protection and impact resistance.

7. The case of claim 6, wherein the lining is an impact-absorbing or cushioning lining.

8. The case of claim 6, wherein the lining is affixed to an inner surface of the housing sections.

9. The case of claim 6, wherein the lining depth on the tail and nose of the case provide flexibility in accommodating size variations of boards.

10. The case of claim 1, wherein the housing further includes a handle on an exterior surface of the housing.

11. The case of claim 1, wherein the housing further includes at least one locking mechanism for securedly locking the sections together.

12. The case of claim 11, wherein the locking mechanism is a latch.

13. A protective case for surfboards, musical instruments, or other large objects, comprising:
- a housing having a rigid, impact-resistant outer surface, the housing being formed from two mating sections, including a top and a bottom section for completely encasing the surfboard from either end, the sections being releasably connectable and lockable at the adjoining edges, when joined to form a middle of the case when the case is configured in an extended position, the housing alternatively configurable into a collapsed storage position when not in use for storing the object;
- the housing being symmetrical about the long axis and about the short axis; and
- a handle that functions as a releasable attaching latch for connecting the two halves.

14. The case of claim 13, further including a multiplicity of latches.

15. The case of claim 13, further including an impact-resistant lining within the housing.

16. A protective case for surfboards, musical instruments, or other large objects, the case comprising:
- a housing having a rigid, impact-resistant outer surface, the housing being formed of two halves, each half formed from a multiplicity of telescoping sections that are selectively configurable between an expanded transport position and a collapsed storage position; and
- the housing including a track system that provides releasable locking engagement of the adjoining sections and a handle that functions as a releasable attaching latch for connecting the two halves.

* * * * *